United States Patent
Friio

(10) Patent No.: US 11,363,141 B2
(45) Date of Patent: Jun. 14, 2022

(54) SYSTEMS AND METHODS RELATING TO ASYNCHRONOUS RESOLUTION OF CUSTOMER REQUESTS IN CONTACT CENTER

(71) Applicant: GENESYS TELECOMMUNICATIONS LABORATORIES, INC., Daly City, CA (US)

(72) Inventor: Andrea Friio, Daly City, CA (US)

(*) Notice: Subject to any disclaimer, the term of this patent is extended or adjusted under 35 U.S.C. 154(b) by 0 days.

(21) Appl. No.: 17/411,338

(22) Filed: Aug. 25, 2021

(65) Prior Publication Data
US 2022/0070296 A1    Mar. 3, 2022

Related U.S. Application Data

(60) Provisional application No. 63/069,934, filed on Aug. 25, 2020.

(51) Int. Cl.
*H04M 3/51* (2006.01)
*G06F 40/30* (2020.01)
(Continued)

(52) U.S. Cl.
CPC .......... *H04M 3/5166* (2013.01); *G06F 40/30* (2020.01); *G10L 15/26* (2013.01); *H04M 3/5191* (2013.01);
(Continued)

(58) Field of Classification Search
CPC ............. H04M 3/5166; H04M 3/5191; H04M 3/5233; H04M 3/5237; H04M 2203/2072; G06F 40/30
(Continued)

(56) References Cited

U.S. PATENT DOCUMENTS

| 2019/0306252 A1* | 10/2019 | Lebedev | ................. | H04L 51/02 |
| 2020/0351405 A1* | 11/2020 | Pace | ................... | H04M 3/5175 |
| 2021/0203784 A1* | 7/2021 | Konig | .................... | G06Q 30/01 |

FOREIGN PATENT DOCUMENTS

| WO | 2017192684 A1 | 11/2017 |
| WO | 2020097616 A1 | 5/2020 |

OTHER PUBLICATIONS

PCT International Search Report and Written Opinion of co-pending PCT application No. PCT/US2021/047497 dated Dec. 13, 2021.

* cited by examiner

*Primary Examiner* — Thjuan K Addy

(57) ABSTRACT

A method for resolving customer requests that includes: providing a personal bot assistant and an asynchronous resolution facilitator; receiving a customer request from a first customer and producing a transcript thereof; determining an intent based on the transcript and customer information relating to the determined intent; transmitting an initial set of data to the asynchronous resolution facilitator and assembling therefrom a resolution package that includes an agent interface showing information required to expeditiously resolve the customer request including one or more recommended business processes; displaying the agent interface on a screen of the agent device; receiving input from the agent device that indicates the agent has completed preparing a resolution for the customer request; and providing notification to the first customer of the achieved resolution via the personal device of the first customer.

20 Claims, 7 Drawing Sheets

(51) Int. Cl.
*H04M 3/523* (2006.01)
*G10L 15/26* (2006.01)
(52) U.S. Cl.
CPC ....... *H04M 3/5233* (2013.01); *H04M 3/5237* (2013.01); *H04M 2203/2072* (2013.01)
(58) Field of Classification Search
USPC ............ 379/265.02, 265.01, 265.05, 265.11, 379/265.12, 266.1, 242, 265.09, 265.13
See application file for complete search history.

SYSTEMS AND METHODS RELATING TO ASYNCHRONOUS RESOLUTION OF CUSTOMER REQUESTS IN CONTACT CENTER

CROSS REFERENCE TO RELATED APPLICATION

This application claims the benefit of U.S. Provisional Patent Application No. 63/069,934, titled "SYSTEMS AND METHODS RELATING TO ASYNCHRONOUS RESOLUTION OF CUSTOMER REQUESTS IN CONTACT CENTER", filed in the U.S. Patent and Trademark Office on Aug. 25, 2020, the contents of which are incorporated herein.

BACKGROUND

The present invention generally relates to telecommunications systems in the field of customer relations management including customer assistance via call or contact centers and internet-based service options. More particularly, but not by way of limitation, the present invention pertains to systems and methods for automating aspects of contact center operations and customer experience, including customer services offered through an application executed on a mobile computing device.

BRIEF DESCRIPTION OF THE INVENTION

The present invention includes a computer-implemented method for resolving customer requests that includes: providing a personal bot assistant and an asynchronous resolution facilitator; receiving a customer request from a first customer, the first customer request being received in a first conversation between the first customer and the personal assistant bot via a personal device corresponding to the first customer; producing a transcript of the first conversation; determining an intent of the customer request based on the transcript; determining customer information relating to the first customer relevant to the determined intent; transmitting an initial set of data to the asynchronous resolution facilitator, the initial set of data including the transcript of the first conversation, the determined intent of the customer request, and the customer information; receiving the initial set of data and assembling a resolution package that includes instructions for displaying an agent interface and metadata associated with the agent interface, wherein the assembling the resolution package comprises: determining, based on the intent of the customer request, one or more recommended business processes for resolving the customer request; generating the agent interface such that the agent interface, once displayed, visually communicates at least a portion of the initial set of data and the one or more recommended business processes; determining the metadata for associating with the agent interface, wherein the metadata comprises criteria for routing the customer request based on the determined intent; transmitting the resolution package to a routing engine of the contact center; using the routing engine to route the resolution package to an agent device of a selected agent of the contact center, the selected agent being selected from among the agents of the contact center based on the criteria of the metadata; and based on the instructions received in the resolution package, displaying the agent interface on a screen of the agent device; subsequent to displaying the agent interface on the agent device, receiving input from the agent device that indicates the selected agent deems a resolution of the customer request is achieved; and providing, by the personal bot assistant, notification to the first customer of the achieved resolution via the personal device of the first customer.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
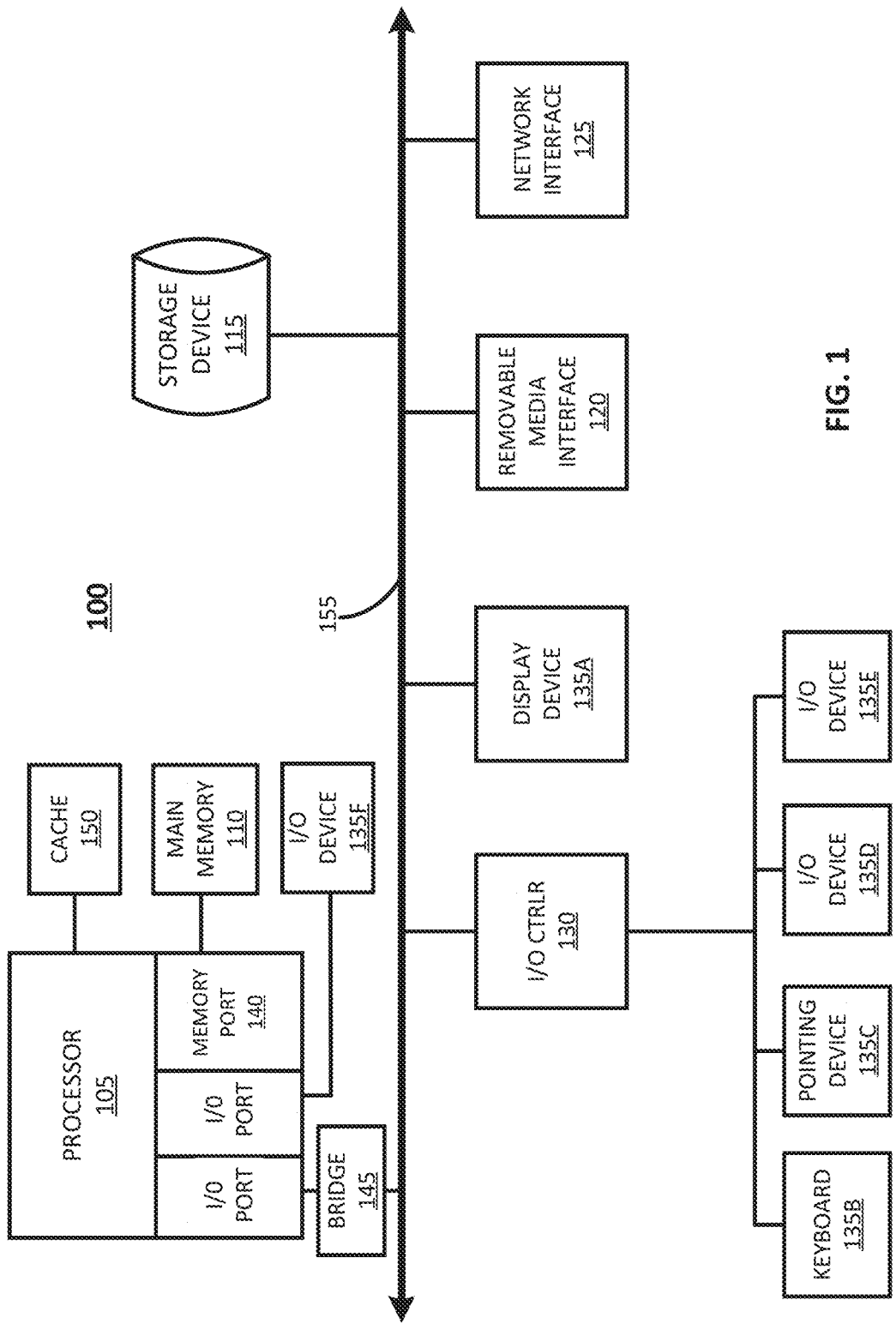
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein.

Contact Center

Figure 2:
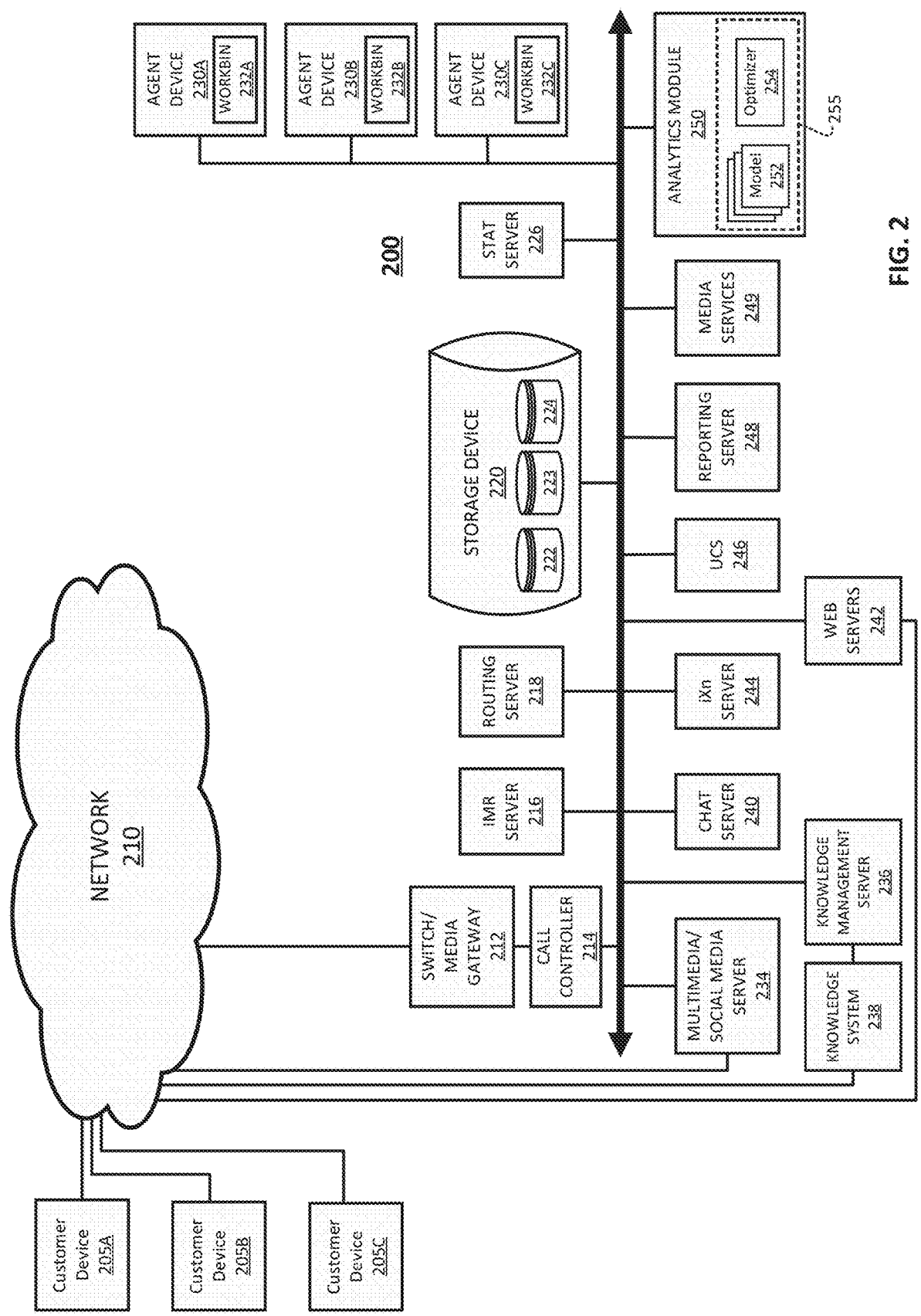
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

Chat Systems

Figure 3:
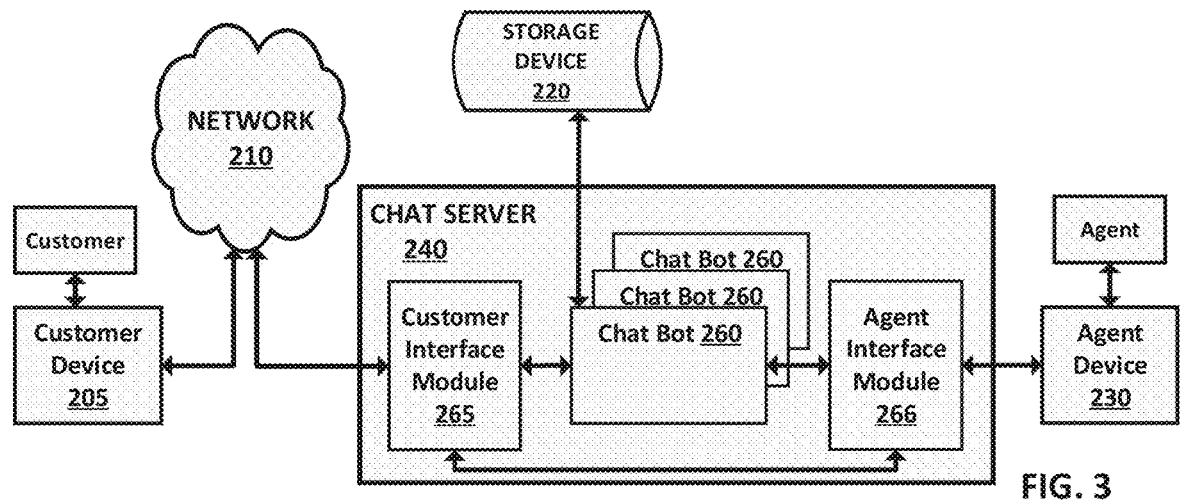
FIG. 3 is schematic block diagram showing further details of a chat server operating as part of the chat system according to embodiments of the present invention.
Figure 4:
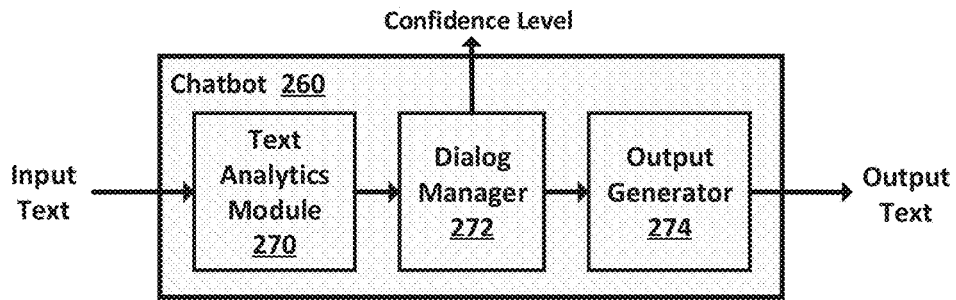
FIG. 4 is a schematic block diagram of a chat module according to embodiments of the present invention.
Figure 5:
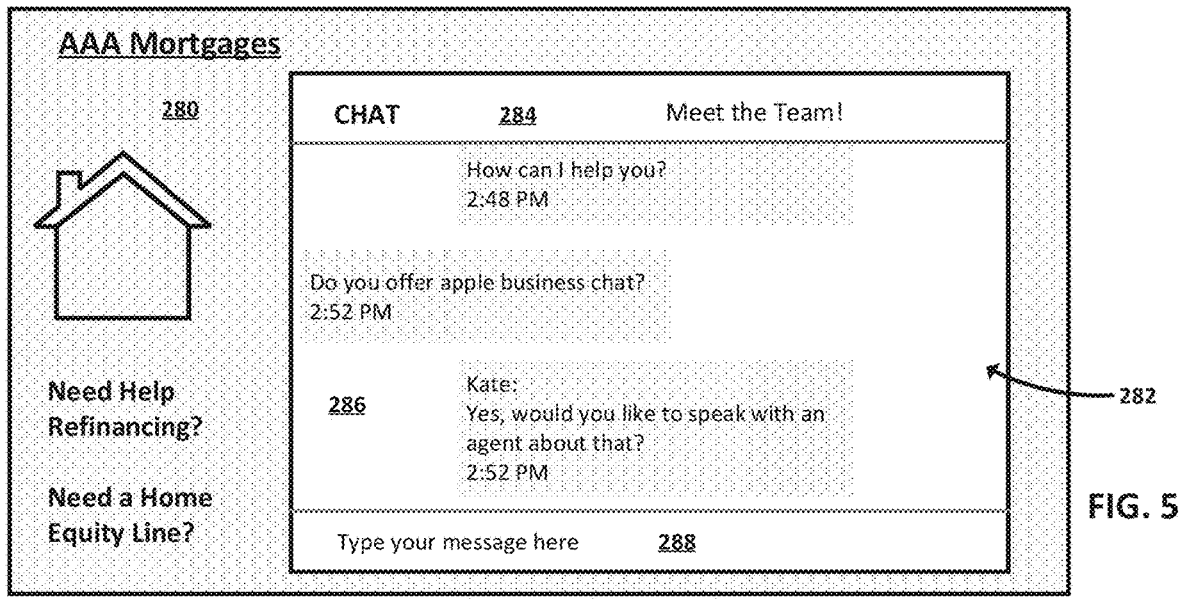
FIG. 5 is an exemplary customer chat interface according to embodiments of the present invention.

Turning to FIGS. 3, 4 and 5, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by a enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generating user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Reference will now be made to FIG. 5, in which a webpage 280 having an exemplary implementation of a chat feature 282 is presented. The webpage 280, for example, may be associated with an enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. As will be appreciated, other configurations are also possible.

Customer Automation Systems

Embodiments of the present invention include systems and methods for automating and augmenting customer actions during various stages of interaction with a customer service provider or contact center. As will be seen, those various stages of interaction may be classified as pre-contact, during-contact, and post-contact stages (or, respectively, pre-interaction, during-interaction, and post-interaction stages). With specific reference now to FIG. 6, an exemplary customer automation system 300 is shown that may be used with embodiments of the present invention. To better explain how the customer automation system 300 functions, reference will also be made to FIG. 7, which provides a flowchart 350 of an exemplary method for automating customer actions when, for example, the customer interacts with a contact center. Additional information related to customer automation are provided in U.S. application Ser. No. 16/151,362, filed on Oct. 4, 2018, entitled "System and Method for Customer Experience Automation", the content of which is incorporated herein by reference.

Figure 6:
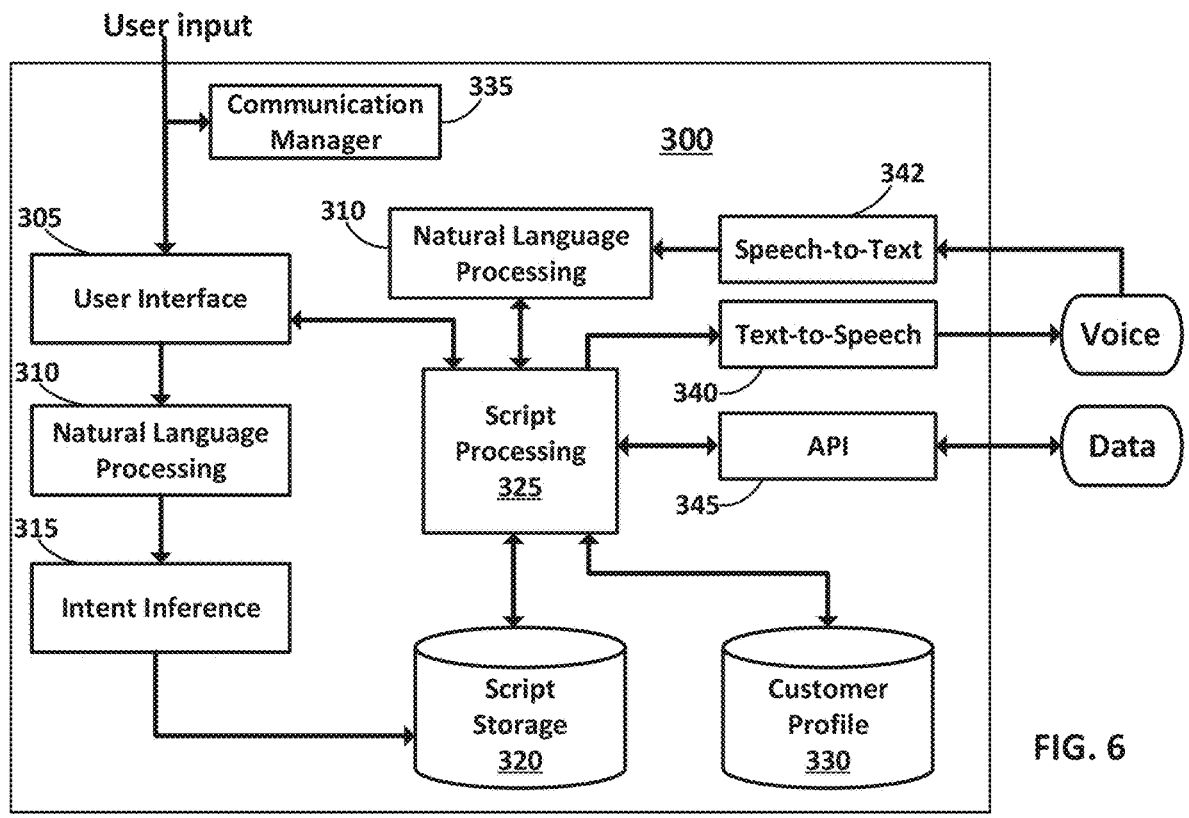
FIG. 6 is a block diagram of a customer automation system according to embodiments of the present invention.

The customer automation system 300 of FIG. 6 represents a system that may be generally used for customer-side automations, which, as used herein, refers to the automation of actions taken on behalf of a customer in interactions with customer service providers or contact centers. Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments are primarily described in the context of implementation via an application running on the customer device 205. However, it should be understood that present embodiments are not limited thereto.

The customer automation system 300 may include several components or modules. In the illustrated example of FIG. 6, the customer automation system 300 includes a user interface 305, natural language processing (NLP) module 310, intent inference module 315, script storage module 320, script processing module 325, customer profile database or module (or simply "customer profile") 330, communication manager module 335, text-to-speech module 340, speech-to-text module 342, and application programming interface (API) 345, each of which will be described with more particularity with reference also to flowchart 350 of FIG. 7.

Figure 7:
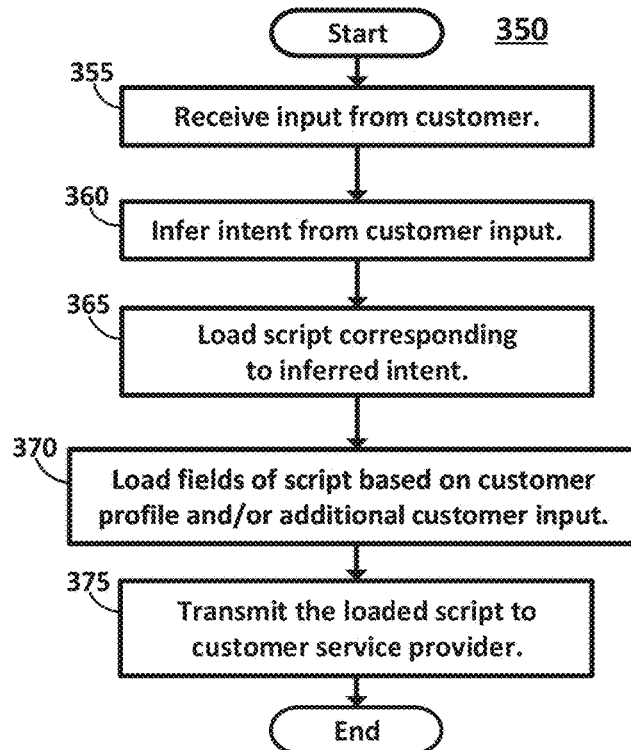
FIG. 7 is a flowchart of a method for automating an interaction on behalf of a customer according to embodiments of the present invention.

In an example of operation, with specific reference now to the flowchart 350 of FIG. 7, the customer automation system 300 may receive input at an initial step or operation 355. Such input may come from several sources. For example, a primary source of input may be the customer, where such input is received via the customer device. The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers a intent using the intent inference module 315. For example, where the input is provided as speech from the customer, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the provided input using artificial intelligence or machine learning techniques. Such artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand the intent from the input, a selection of several intents may be provided to the customer in the user interface 305. The customer may then clarify their intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. Such scripts may include a set of commands or operations, pre-written speech or text, and/or fields of parameters or data (also "data fields"), which represent data that is required to automate an action for the customer. For example, the script may include commands, text, and data fields that will be needed in order to resolve the issue specified by the customer's intent. Scripts may be specific to a particular contact center and tailored to resolve particular issues. Scripts may be organized in a number of ways, for example, in a hierarchical fashion, such as where all scripts pertaining to a particular organization are derived from a common "parent" script that defines common features. The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. The data for many of the data fields within the script may be automatically loaded with data retrieved from data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, an API 345 is used so to interact with the contact center directly. Contact centers may define a protocol for making commonplace requests to their systems, which the API 345 is configured to do. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Personal Bot

Figure 8:
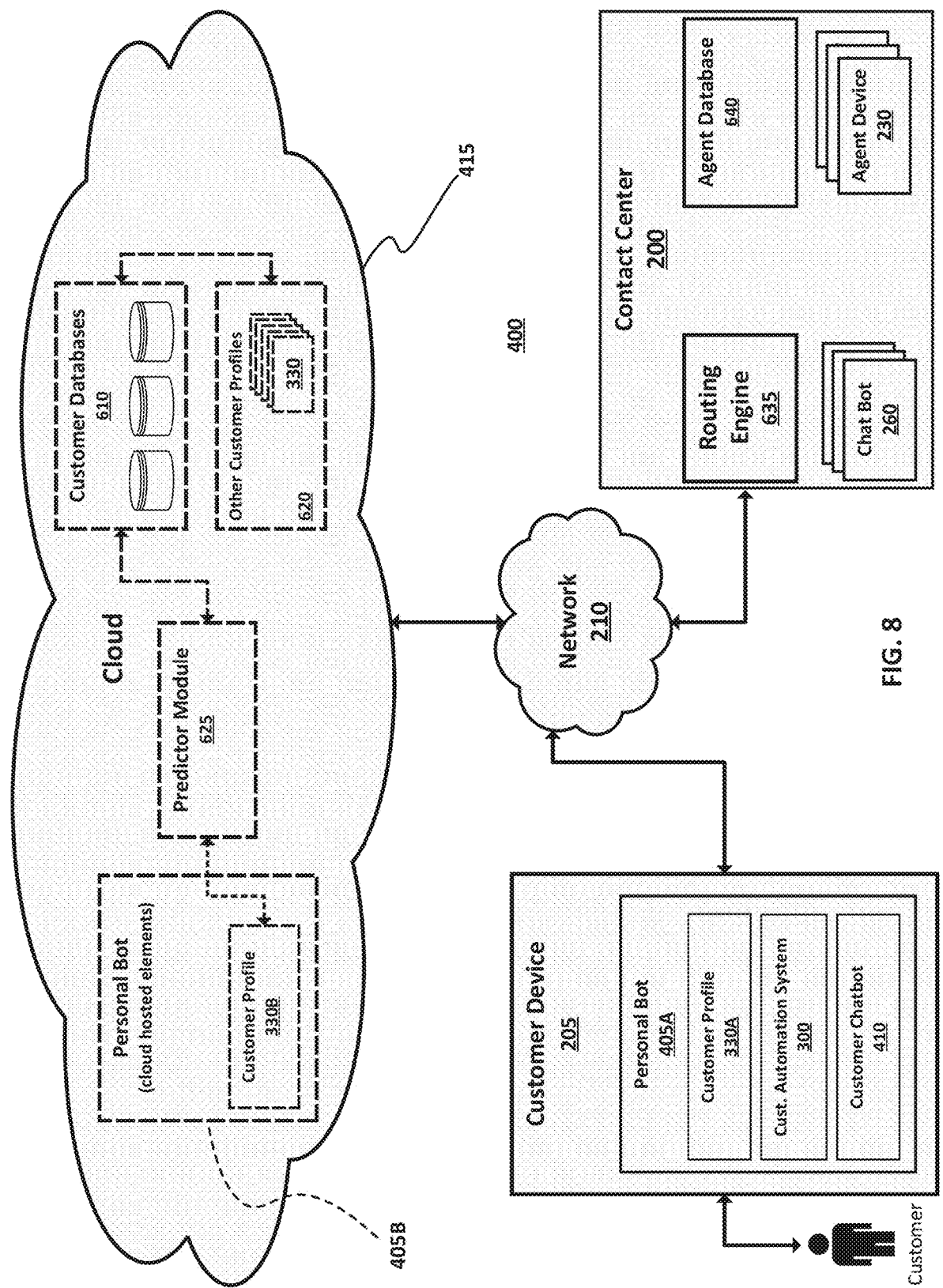
FIG. 8 is a schematic representation of an exemplary system including a personal bot and personalized customer profile in accordance with the present invention.

With reference now to FIG. 8, an exemplary system 400 is shown that includes an automated personal assistant or, as referred to herein, personal bot 405. As will be seen, the personal bot 405 is configured to automate aspects of interactions with a customer service provider on behalf of a customer. As stated above, present invention relates to systems and methods for automating aspects of the customer-side of the interactions between customers and customer service providers or contact centers. Accordingly, the personal bot 405 may provide ways to automate actions that customers are required to perform when contacting, interacting, or following up with contact centers.

The personal bot 405, as used herein, may generally reference any customer-side implementation of any of the automated processes or automation functionality described herein. Thus, it should be understood that, unless otherwise specifically limited, the personal bot 405 may generally employ any of the technologies discussed herein—including those related to the chatbots 260 and the customer automation system 300—to enable or enhance automation services available to customers. For example, as indicated in FIG. 8, the personal bot 405 may include the functionality of the above-described customer automation system 300. Additionally, the personal bot 405 may include a customer-side implementation of a chatbot (for example, the chatbot 260 of FIGS. 4 and 5), which will be referred herein as a customer chatbot 410. As will be seen, the customer chatbot 410 may be configured to interact privately with the customer in order to obtain feedback and direction from the customer pertaining to actions related to ongoing, future, or past interactions with contact centers. Further, the customer chatbot 410 may be configured to interact with live agents or chatbots associated with a contact center on behalf of the customer.

As shown in FIG. 8, in regard to system architecture, the personal bot 405 may be implemented as a software program or application running on a mobile device or personal computing device (shown as a customer device 205) of the customer. For example, the personal bot 405A may include locally stored modules, including the customer automation system 300, the customer chatbot 410, and elements of the customer profile 330A. The personal bot 405 also may include remote or cloud computing components (e.g., one or more computer servers or modules connected to the customer device 205 over a network 210), which may be hosted in a cloud computing environment or cloud 415 (see cloud hosted elements of the personal bot 405B). For example, as shown in the illustrated example, the script storage module 320 and elements of the customer profile 330B may be stored in databases in the cloud 415. It should be understood, however, that present embodiments are not limited to this arrangement and, for example, may include other components being implemented in the cloud 415.

Accordingly, as will be seen, embodiments of the present invention include systems and methods for automatically initiating and conducting an interaction with a contact center to resolve an issue on behalf of a customer. Toward this objective, the personal bot 405 may be configured to automate particular aspects of interactions with a contact center on behalf of the customer. Several examples of these types of embodiments will now be discussed in which resources described herein—including the customer automation system 300 and customer chatbot 410—are used to provide the necessary automation. In presenting these embodiments, reference is again made to previously incorporated U.S. application Ser. No. 16/151,362, entitled "System and Method for Customer Experience Automation", which includes further background and other supporting materials.

Embodiments of the present invention include the personal bot 405 and related resources automating one or more actions or processes by which the customer initiates a communication with a contact center for interacting therewith. As will be seen, this type of automation is primarily aimed at those actions normally occurring within the pre-contact or pre-interaction stage of customer interactions.

For example, in accordance with an exemplary embodiment, when a customer chooses to contact a contact center, the customer automation system 300 may automate the process of connecting the customer with the contact center. For example, present embodiments may automatically navigate an IVR system of a contact center on behalf of the customer using a loaded script. Further, the customer automation system 300 may automatically navigate an IVR menu system for a customer, including, for example, authenticating the customer by providing authentication information (e.g., entering a customer number through dual-tone multi-frequency or DTMF or "touch tone" signaling or through text to speech synthesis) and selecting menu options (e.g., using DTMF signaling or through text to speech synthesis) to reach the proper department associated with the inferred intent from the customer's input. More specifically, the customer profile 330 may include authentication information that would typically be requested of customers accessing customer support systems such as usernames, account identifying information, personal identification information (e.g., a social security number), and/or answers to security questions. As additional examples, the customer automation system 300 may have access to text messages and/or email messages sent to the customer's account on the customer device 205 in order to access one-time passwords sent to the customer, and/or may have access to a one-time password (OTP) generator stored locally on the customer device 205. Accordingly, embodiments of the present invention may be capable of automatically authenticating the customer with the contact center prior to an interaction. In accordance with other embodiments, the customer automation system 300 may automate a process for preparing an agent before a call from a customer. For example, the customer automation system 300 may send a request that the agent study certain materials provided by the customer before the live call happens.

Embodiments of the present invention further include the personal bot 405 and related resources automating the actual interaction (or aspects thereof) between the customer and a contact center. As will be seen, this type of automation is primarily aimed at those actions normally occurring within the during-contact or during-interaction stage of customer interactions.

For example, the customer automation system 300 may interact with entities within a contact center on behalf of the customer. Without limitation, such entities may include automated processes, such as chatbots, and live agents. Once connected to the contact center, the customer automation system 300 may retrieve a script from the script storage module 320 that includes an interaction script (e.g., a dialogue tree). The interaction script may generally consist of a template of statements for the customer automation system 300 to make to an entity within the contact center, for example, a live agent. In exemplary embodiments, the customer chatbot 410 may interact with the live agent on the customer's behalf in accordance with the interaction script. As already described, the interaction script (or simply "script") may consist of a template having defined dialogue (i.e., predetermined text or statements) and data fields. As previously described, to "load" the script, information or data pertinent to the customer is determined and loaded into the appropriate data fields. Such pertinent data may be retrieved from the customer profile 330 and/or derived from input provided by the customer through the customer interface 305. According to certain embodiments, the customer chatbot 410 also may be used to interact with the customer to prompt such input so that all of the necessary data fields within the script are filled. In other embodiments, the script processing module 325 may prompt the customer to supply any missing information (e.g., information that is not available from the customer profile 330) to fill in blanks in the template through the user interface 305 prior to initiating a communication with the contact center. In certain embodiments, the script processing module 325 may also request that the customer confirm the accuracy of all of the information that the customer automation system 300 will provide to the contact center.

Once the loaded script is complete, for example, the interaction with the live agent may begin with an initial statement explaining the reason for the call (e.g., "I am calling on behalf of your customer, Mr. Thomas Anderson, regarding what appears to be double billing."), descriptions of particular details related to the issue (e.g., "In the previous three months, his bill was approximately fifty dollars. However, his most recent bill was for one hundred dollars."), and the like. While such statements may be provided in text to the contact center, it may also be provided in voice, for example, when interacting with a live agent. In regard to how such an embodiment may function, a speech synthesizer or text-to-speech module 340 may be used to generate speech to be transmitted to the contact center agent over a voice communication channel. Further, speech received from the agent of the contact center may be converted to text by a speech-to-text converter 342, and the resulting text then may be processed by the customer automation system 300 or customer chatbot 410 so that an appropriate response in the dialogue tree may be found. If the agent's response cannot be processed by the dialogue tree, the customer automation system 300 may ask the agent to rephrase the response or may connect the customer to the agent in order to complete the transaction.

While the customer automation system 300 is conducting the interaction with the live agent in accordance with the interaction script, the agent may indicate their readiness or desire to speak to the customer. For the agent, readiness might occur after reviewing all of the media documents provided to the agent by the customer automation system 300 and/or after reviewing the customer's records. In exemplary embodiments, the script processing module 325 may detect a phrase spoken by the agent to trigger the connection of the customer to the agent via the communication channel (e.g., by ringing the customer device 205 of the customer). Such triggering phrases may be converted to text by the speech-to-text converter 342 and the natural language processing module 310 then may determine the meaning of the converted text (e.g., identifying keywords and/or matching the phrase to a particular cluster of phrases corresponding to a particular concept).

As another example, the customer automation system 300 may present automatically generated "quick actions" to the customer based on the customer's inferred intent and other data associated with the ongoing interaction. In some circumstances, the "quick actions" require no further input from the customer. For example, the customer automation system 300 may suggest sending an automatically generated text or email message to the contact center directly from a main menu screen, where the message describes the customer's issue. The message may be generated automatically by the script processing module based on a message template provided by the script, where portions of the template that contain customer-specific and incident-specific data are automatically filled in based on data collected about the customer (e.g., from the customer profile) and that the customer has supplied (e.g., as part of the initial customer input). For example, in the case where the customer input references a question about a possible double billing by a particular service provider, the script processing module 325 can reference previous billing statements, which may be stored as part of the customer profile 330, to look for historical charges. The customer automation system 300 infers from these previous billing statements that the amount charged for the period in question was unusually high. In such cases, the system may automatically generate a message which may contain the information about the customer's typical bills and the problem with the current bill. The customer can direct the customer automation system 300 to send the automatically generated message directly to the contact center associated with the service provider. In exemplary embodiments, the script may provide multiple templates, and the customer may select from among the templates and/or edit a message prior to sending, in order to match the customer's personality or preferred tone of voice.

Embodiments of the present invention include methods and systems for identifying outstanding matters or pending actions for a customer that need additional attention or follow-up, where those pending actions were raised during an interaction between the customer and a contact center. Once identified, other embodiments of the present invention include methods and systems for automating follow-up actions on behalf of the customer for moving such pending actions toward a resolution. For example, via the automation resources disclosed herein, the personal bot 405 may automate subsequent or follow-up actions on behalf of a customer, where those follow-up actions relate to actions pending from a previous interaction with a customer service provider. As will be appreciated, this type of automation is primarily aimed at those actions normally occurring within the post-contact or post-interaction stage of a customer interaction, however it also includes the automation of action that also can be characterized as preceding or prompting a subsequent customer interaction.

With continued reference to FIG. 8, attention will now focus on aspects of the present invention aimed at gathering, maintaining, analyzing, and using customer data and profiles. For example, systems and methods are disclosed for building highly personalized customer profiles that facilitate the mining and use of customer data. As will be seen, the customer profiles of the present invention may be used in several ways, including implementing personalized customer services aimed at improving the customer experience.

The present invention discloses improved systems and methods for gathering, maintaining, analyzing, and using customer data and profiles. For example, systems and methods are disclosed for building highly personalized customer profiles that facilitate the analysis and mining of customer data. From there, the customer profiles of the present invention may be used in several ways, including implementing personalized customer services aimed at improving the customer experience and/or removing the interaction "friction" that normally occurs between customers and contact centers. On the customer-side of the interaction, for example, routing strategies can become more personalized in accordance with specific customer preferences and a present emotional state, thereby making routing more customer centric. On the contact center-side of the interaction, the present customer profiles also may be used toward improving contact center operations, such as, for example: making call forecasting more context oriented and reliable; improving handle time predictions and queue optimization; improving outbound campaigns (e.g., by targeting customers who are more likely to see value in and respond positively to a particular offer); improving agent assists or automated processes with more customer personalization (e.g., by anticipating customer needs to reduce the steps needed to complete an interaction and/or alleviate need for customer to provide information during an interaction); and improving customer communications through greater personalization.

Before proceeding, several terms will first be presented and defined in accordance with their intended usage. As used herein, "customer experience" generally refers to the experience a customer has when interacting with a customer service provider and, more specifically, refers to the experience a customer has during an interaction, i.e., as he interacts with a contact center. As used herein, "customer data" refers to any information about a customer that can be gathered and maintained by a customer service provider. As provided below, such customer data may be categorized with reference to several different information types. In discussing how such data is stored, reference may be made to a "customer profile" (such as customer profile 330), which, as used herein, refers a collection or linking of data elements relevant to a particular customer. Reference may also be made to "customer databases" (such as customer databases 610), which, as used herein, refers to a collection or linking of data elements relevant to or gathered from a large population of customers (or "customer population"). Further, as stated, reference may be made interchangeably to contact center or customer service provider. It should also be understood that, unless otherwise specifically limited, reference to a contact center includes reference to the associated organization or enterprise on behalf of which the customer services are being provided. This includes arrangements in which the associated organization or enterprise is providing the customer services through an inhouse contact center as well as arrangements in which a third-party contact center contracts with the organization or enterprise for providing such services.

As shown in FIG. 8, an exemplary system 400 is shown that includes a personal bot 405 running on a customer device 205, where the personal bot 405 facilitates the creation and maintenance of a personalized customer profile database or module (or simply "customer profile") 330. As shown in the example, the customer profile 330 may include elements 330A local to the customer device 205 as well as remote or cloud hosted elements 330B. The system 600 may further include customer databases 610, other customer profiles 620, and a predictor module 625.

For the sake of an example, a customer may have a mobile device or smart phone on which is running an application implementing local aspects of the personal bot 405. In setting up a customer profile 330, the personal bot 405 may serve as a means for the customer to input information. For example, the personal bot 405 may prompt and accept direct input of information from the customer by voice or text. The customer may also upload files to the personal bot 405 or provide the personal bot 405 with access to pre-existing databases or other files from which information about the customer may be obtained.

The personal bot 405 also may gather information about the customer by monitoring customer behavior and actions through the customer's use of the device 205. For example, the personal bot 405 may collect data that relates to other activities that the customer performs through the device, such as email, text, social media, internet usage, etc. The personal bot 405 also may monitor and collect data from each of the interactions the customer has with customer service providers, such as a contact center system 200, through the customer device 205. In this way, data may be collected from interactions occurring with many different contact centers.

In use, at the conclusion of each interaction, the personal bot 405 of the present invention may update the profile of the customer in accordance with data gleamed from that interaction. Such interaction data may include any of the types of data described herein. As discussed more below, once the profile is updated, it will include data associated with that most recent interaction as well as data from other past interactions. This updated or current dataset then may be analyzed in relation to one or more customer databases 610, which, as used herein, are data repositories housing customer data, such as interaction data relating to past interactions, from a large population of other customers. The analysis may be performed with the predictor module 625, which may include a machine learning algorithm that is configured to find data driven insights or predictors (or, as used herein, "interaction predictors").

As used herein, the interaction predictors represent a behavioral factor attributable to the customer given the first interaction type. As will be seen, the behavioral factor of the interaction predictor may include an emotional state, behavioral tendency, or preference for a particular customer given a type of interaction (also "interaction type"). The interaction predictor may be generated and applied in real time, for example, by the predictor module 625. Alternatively, the interaction predictors may be determined and stored in the customer profile 330 of a given customer as a way to augment or further personalize the profile. Such stored interaction predictors then may be applied in future interactions involving the customer when found relevant thereto. The predictor module 625 may be a module within the personal bot 405 or, as illustrated, may be a separate module that communicates with the personal bot 405.

Thus, in general, a personal bot 405 may gather relevant information as a customer interacts with contact centers on his mobile device. The personal bot 405 may gather other types of information, as described above, and then may aggregate that data to build a highly personalized customer profile 330. As will be appreciated, when a customer profile is created and maintained by a contact center, it is generally limited to data pertaining to past interactions occurring between a customer and a particular contact center. In the present invention, with the customer profile 330 being created and maintained on the customer-side of the interaction, the collection of data is not so limited. Instead data may be gathered from any of the interactions involving the customer, which will typically result in a much richer set of data as it reflects a wider spectrum of interactions.

The system of FIG. 8 may include a collection of data that is referred to other customer profiles 620. As will be appreciated, when versions of the personal bot 405 are used by many customers, data may be anonymously gleaned from the many corresponding customer profiles 330 (as shown within the other customer profiles 620) so to create rich repositories of customer data. For example, such data repositories may include information taken from a multitude of past interactions covering a wide spectrum of both customers and customer service providers. As indicated, this data may be parsed and aggregated into the customer databases 610 so to provide particular datasets that facilitate machine learning and other data driven analytics.

While the customer profiles 330 of the present invention may include any type of customer data, exemplary embodiments may include several primary categories of information. These categories include: biographic personal data (or simply "personal data"); past interaction data (or simply "interaction data"); feedback data; and choice data. As will also be seen, present systems and methods may predict or infer certain behavior traits, preferences, or tendencies about a customer through data analytics. Such predictions—which are introduced above as "interaction predictors"—may also be stored within a customer profile 330 and then utilized in subsequent interactions as a way of enhancing personalization and facilitating other customer centric features. Alternatively, the interaction predictors may be generated contemporaneously and used in relation to an incoming interaction.

It should be appreciated that, while the data stored within the customer profile 330 may be discussed in categories, the customer profile 330 of the present invention may be structured to include an aggregated collection of information that may be analyzed as a whole. Further, it should be understood that the data within a customer profile 330 may be stored locally on a customer device 204, remotely in the cloud, or some combination thereof. Present systems and methods may further include functionality that protects a customer's data from unwanted disclosure. In general, the data stored within the profile of a customer is controlled by the customer, with the customer deciding what information is to be shared during each interaction with an outside organization or enterprise. Thus, before any customer profile data is shared with an outside entity, such as a contact center or other organization, present systems and methods may first seek to confirm with the customer that such sharing is intended. Additional functionality may enable the partial sharing and use of customer information in ways that maintain a customer's anonymity.

In regard to the types of data stored within a customer profile 330, a first category is referred to herein as personal data. This type of data may include general information about the customer that is generic to all interactions with customer service providers, for example, name, date of birth, address, Social Security number, social media handles, etc. This type of data may also include biographical information, such as education, profession, family, pets, hobbies, interest, etc. This category of data may also include data that is specific to particular contact centers. For example, data related to authentication information specific to the different companies that the customer does business with, including usernames and passwords, may be included. Such personal data may be added to a customer profile 330 when a customer is registering with or setting up the mobile application, i.e., personal bot 405, on his mobile device. For example, a prompt by the personal bot 405 may be provided that initiates input of the necessary information. When setting up the mobile application, the customer may be asked via a user interface generated on his customer device for certain information. Once gathered, the personal data of the customer may be made part of the customer's profile. The customer may update this information at any time. As will be seen, aspects of the personal data may be used to find similarities with other customers, which may be used when making predictions about the customer.

The customer profile 330 of the present invention further may include a category of information referred to herein as past or historical interaction data (or simply "interaction data"). As used herein, this refers to data pertaining to or measuring aspects of previous customer interactions. Accordingly, such data may include a complete historical record of data reflecting all past interaction between a customer and any contact center. Interaction data may include any of the types of information described herein relating to interactions, including type or intent of the interaction, information associated with the dialogue between the agent and customer, such as a recording or transcript, information related to the agent, including agent type and other characteristics, information about results of the interaction, notes provided by the customer or the agent, files shared during the interaction, length of the interaction, call transfers or holds that took place during the interaction, emotional state of the customer, and others. The customer profile 330 may be updated after each new interaction with such interaction data taken therefrom. The interaction data may further include feedback data and choice data, which are discussed below.

The customer profile 330 of the present invention further may include feedback data, which, as used herein, refers to feedback received from a customer that relates to a particular interaction with a contact center. As will be appreciated, feedback and survey responses may provide a valuable indication as to what went right or wrong in an interaction. Often such feedback is provided by customers at the end of an interaction in response to surveys or ratings requests. In accordance with the present invention, any type of feedback, including customer satisfaction score or ratings, provided by a customer at the conclusion of an interaction is saved within a customer profile 330 as feedback data. Systems and methods of the present invention may include functionality wherein the personal bot 405 gathers such feedback data for storage within the customer profile 330. The personal bot 405 may do this via passively recording such feedback when provided by the customer in response to a query initiated by an outside entity, such as a contact center. The personal bot 405 also may actively prompt for such feedback at the end of an interaction and record any responses provided by the customer.

Another type of feedback data may include what will be referred to herein as "conclusory statement data". Conclusionary statement data may include data related to statements made by a customer as the interaction is concluding, where the meaning of the statements is extracted by natural language processing. Conclusory statement data, thus, may be seen as a type of inferred feedback, i.e., feedback inferred from statements made while the interaction is concluding.

For example, the personal bot 405 may gather such conclusory statement data by analyzing statements or comments made by the customer at the conclusion of an interaction and, where appropriate, inferring customer feedback from the analysis of those statements. Specifically, such conclusory statements by the customer may be extracted and analyzed via natural language processing and, when the customer's statements are clear enough to infer feedback with sufficient confidence, the inferred feedback may be gathered for storage within the customer profile 330 as a type of feedback or interaction data. As such statements are often highly relevant as to how the customer feels at the conclusion of an interaction, such inferences can prove useful, particularly where no other rating or survey response is provided by the customer for a given interaction. According to exemplary embodiments, for example, such feedback data may be used to assist contact centers in deciding on the level of service that a customer should receive in a next interaction.

The customer profile 330 of the present invention further may include choice data, which, as used herein, refers to data that relates to a selection or choice made by the customer in selecting an agent. More specifically, choice data refers to automatically learned preferences of the customer that are based on the customer's manual selection of one agent or type of agent over another agent or type of agent.

The data stored within the customer profile 330 of the present invention may further include interaction predictors. As used herein, an interaction predictor is defined as a behavioral characteristic, preference, tendency, or other customer trait that, because of correlations or patterns found to exist within a dataset of relevant customer information, can be inferred upon or attributed to a given customer. As will be seen, some interaction predictors may be used to predict broad traits, behaviors, or tendencies that are common to many other customers, while other interaction predictors are highly contextual and specific to particular type of interaction, such as, for example, interactions involving a particular intent, emotional state, or contact center. As will be appreciated, the interaction predictors of the present invention offer a way to add detail to a customer profile 330 with assumed characteristics that then may be used to personalize services and facilitate interactions.

In deriving the interaction predictors, any of the systems and methods described herein may be used. In exemplary embodiments, as shown in FIG. 8, the personal bot is configured to communicate with a predictor module 625 that includes an artificial intelligence or machine learning algorithm. As will be appreciated, the machine learning algorithm may be applied to a dataset of customer information and, therefrom, learn knowledge in the form of data patterns correlating one or more input factors to one or more outcomes, with those correlations forming the basis of the interaction predictors. For example, the machine learning algorithm in the predictor module 625 may extract such patterns based on monitored customer actions and associated outcomes. Once such knowledge is acquired, it may be put to use in the form of the present interaction predictors to predict outcomes when new inputs are encounters, such as those presented in an incoming interaction.

Any one or more existing machine learning algorithms may be invoked to do such learning, including without limitation, linear regression, logistic regression, neural network, deep learning, Bayesian network, tree ensembles, and the like. For example, linear regression assumes that there is a linear relationship between input and output variables, whereas, in the case of neural networks, the learning is done via a backward error propagation where the error is propagated from an output layer back to an input layer to adjust corresponding weights of inputs to the input layer.

For the sake of providing examples as to how such interaction predictors may be derived for a given customer, reference will now be made to an exemplary customer "Adam". To begin the process, the machine learning algorithm of the predictor module 625 may be configured to monitor a given dataset. This dataset may be obtained from any of the several sources of data described herein. For example, one or more data sources may be derived from data maintained within Adam's own customer profile (i.e., customer profile 330). The machine learning algorithm may have access to and monitor several of the types of data stored within Adam's customer profile, e.g., the personal data, interaction data, feedback data, and/or choice data.

For example, to gain insights on what works best for Adam during interactions, the machine leaning algorithm could monitor (i.e., use as a training dataset) Adam's interaction data and identify particular factors that consistently correlate with more successful outcomes. As a more specific example, the machine learning algorithm of the predictor module 625 may monitor the choice data within Adam's customer profile—i.e., the agents that Adam selects when given a choice—to identify patterns relating to the type of agents Adam prefers. Once identified, such a pattern could become the basis for an interaction predictor, which the predictor module 625 would then cause to be stored within the Adam's customer profile. When circumstances later arise that are relevant to the interaction predictor, the interaction predictor could be recalled from Adam's customer profile and used to facilitate choices as to how best to provide services to Adam. Specifically, for example, the interaction predictor could be used to predict which agent out of those available would be most preferable to Adam, as will be discussed more below.

In accordance with other aspects of the present invention, the machine learning algorithm of the predictor module 625 may also monitor and derive datasets from one or more customer databases 610, which, as used herein, refer to a collection of customer data gathered from "other customers". For example, the customer databases 610 may include data gathered from a large customer population. Such customer databases 610 may store any of the customer data types discussed herein and include a multitude of samples collected from a customer population. As an example, one of the customer databases 610 may include data aggregated from the personalized customer profiles of the present invention, where those customer profiles 330 correspond to customers within a customer population (with those customer profiles 330 being represented by those depicted within the other customer profiles 620).

In accordance with an exemplary embodiment, the machine learning algorithm may monitor or derive training datasets from the customer databases 610, such as a dataset that includes interaction data taken from previous interactions between customers within the customer population and different contact centers. The machine learning algorithm may then analyze the data within this database to identify patterns in which particular factors consistently correlate with certain outcomes. As before, such patterns or correlations may then become the basis for identifying interaction predictors. Thus, based on similarities found to exist between Adam and the other customers within the customer population, the predictor module 625 may cause one or more interaction predictors to be applied to or used in connection with Adam.

When identified from a large database of customer information, interaction predictors may be found to be predictively relevant to the customer population as a whole or to a group or subpopulation defined within the customer population. Thus, in accordance with the present invention, the applicability of such interaction predictors to any particular customer, such as Adam, may be predicated on a degree of similarity found to exist between Adam and a given subpopulation. Thus, the predictor module 625 may attribute such an interaction predictor to Adam only after determining that a sufficient degree of similarity exists between Adam and the customers within the corresponding subpopulation or, put another way, whether Adam is determined to be member of that subpopulation. Upon determining that a sufficient level of similarity exists between Adam and that subpopulation, the predictor module 625 may add the particular interaction predictor to Adam's customer profile, where it will remain until further machine learning makes necessitates its modification or removal.

As a general example, a customer database 610 that stores interaction data may include data collected from interactions between a customer population and many different contact centers. A predictive correlation or other data driven insight—generally referred to herein as an interaction predictor—is then identified via the machine learning algorithm of the predictor module 625 by monitoring and analyzing the customer database 610. Through this analysis, it may further be determined that the identified interaction predictor is only applicable to a particular subpopulation within the customer population. In accordance with the present invention, the interaction predictor then is selectively applied to a particular customer if it is determined that the customer is a member of the given subpopulation or, at least, sufficiently similar to another customer within the given subpopulation.

Whether gleamed from the customer's own past behavior, based on the past behavior of other similar customers, or some combination thereof, once determined, the interaction predictors may be applied to a particular customer (for example, saved within his customer profile 330) and then used to make certain insights or predictions about that customer in order to enhance aspects of customer service. As will be appreciated, the interaction predictors stored within a customer profile 330 may be dynamically updated as needed so that those currently stored reflect changes, updates, or additions to the underlying datasets. For example, in an interaction that just concluded, customer Adam made an agent selection that significantly modifies the choice data stored in his customer profile. According to exemplary embodiments, the machine learning algorithm may continue to monitor Adam's customer profile (and choice data included therein) and modify the interaction predictors in Adam's customer profile as needed given the modification to the underlying dataset (i.e., the dataset as modified by his recent interaction).

Changes to data within the customer databases 610 may also modify how interaction predictors are applied to Adam. For example, the addition of new interaction data within a customer database may modify interaction predictors that are identified therein. To the extent the modification impacts any of the interaction predictors found applicable to Adam, Adam's customer profile would be updated to reflect that. As another example, if Adam inputs new personal information, such as a change in professional status or where he lives, existing similarities between Adam and certain groups within the customer population may be altered. As those similarities change, the interaction predictors that are attributed to Adam or used in interactions involving Adam will be updated to reflect the changed similarities.

With the data and the interaction predictors stored in a given customer profile 330, aspects of the present invention may be used to facilitate the personalized delivery of customer services related to a present or incoming interaction. For example, contextual information or factors related to the incoming interaction may be identified and, based on those identified factors, predictions can be made about the customer by determining which of the stored interaction predictors are applicable. Alternatively, it should also be understood that such predictions about the customer may be made contemporaneously with the incoming interaction via the machine learning algorithm (or models developed therefrom) finding similarities in the contextual information around the incoming interaction and past interactions experienced by the customer and/or other similar customers within the customer databases 610. In either case, one or more interaction predictors applicable to the incoming interaction may be used to facilitate the delivery of services to the customer during the incoming interaction.

In accordance with exemplary embodiments, the relevant interaction predictors along with any other relevant information from the customer profile 330 may be packaged within an interaction profile and then delivered to a contact center for use thereby. As will be seen, the contact center may then use this package data or interaction profile to facilitate decisions as to the nature of services that should be provided to the customer during the incoming interaction. Embodiments will now be discussed covering exemplary implementations as to how this information may be used. For the sake of these example, reference again may be made to customer Adam.

In accordance with a first example, systems and methods of the present invention may be used to predict a customer's emotional state in the incoming interaction. For example, based on the series of interactions that Adam has experienced, interaction predictors may be developed that relates such interactions to a pattern of emotional states, which may be gleaned from analyzing interaction transcripts for language indicative of particular emotional states. A customer's emotional state, for example, may vary in accordance with a predictable pattern that relates to factors such as: intent of the interaction; recent unsuccessful efforts to resolve the same issue; unfavorable history with a certain enterprise; etc. By learning these patterns using the systems and methods disclosed above, it now becomes possible to make predictions as to the emotional state that the customer is likely to exhibit in the next incoming interaction.

For example, Adam calls Best Buy to enquire about an online order that he placed last week for an iPhone. Best Buy, as a retailer, answer Adam's question, but tells him that the order was placed with Apple. Best Buy gives Adam with an order identification number and redirects him to a customer service provider associated with Apple. Adam, now connected with Apple, is told by an agent that his order has been fulfilled and sent to FedEx for shipment. The Apple agent further provides a reference shipping number for tracking the order. With this new information, Adam goes to the FedEx webpage, however he finds that the tracking information fails to provide any information about his order. Adam now calls FedEx to inquire about it. After being on hold for several minutes, a FedEx agent finally informs Adam that FedEx has not received the requested order from Apple and that the tracking number he has been provided is incorrect. Adam now instigates another interaction—referred to as an incoming interaction for the sake of describing functionality—with Apple. Each of these interactions are done through a customer device of Adam that has a personal bot 405 in accordance with the present invention.

The personal bot 405 of the present invention may be tracking the interactions Adam has instigated with the customer service providers associated with Best Buy, Apple, and FedEx. Using systems and methods described herein, Adam's customer profile may be updated with each of these interactions as they happen and, through natural language processing of transcripts and other available information relating to the interactions, the personal bot 405 may become aware that: a) the situation involves several interactions relating to common subject matter (i.e., the same problem); b) that Adam has already initiated several recent interactions with different enterprises in an effort to resolve that problem; and c) Adam has so far been unsuccessful and the issue remains unresolved.

To continue the example, the predictor module 625 may have gleamed several interaction predictors that are relevant to this situation. As described above, these may have been determined via analyzing (e.g., by using a machine learning algorithm) data associated with Adam's own past behavior and/or the behavior of a population or group of other customers that are similar to Adam in ways found to be predictively relevant. The applicable interaction predictors, for example, may predict that the situation is one that likely would induce a particular emotional state for the customer, such as negative emotions like anger or frustration. Thus, by using information stored within the Adam's customer profile and recognizing the number and subject matter of Adam's recent interactions, a prediction can be made as to Adam's emotional state coming into the incoming interaction that Adam just initiated with Apple. Specifically, it can be predicted that Adam will likely be angry or frustrated. This type of insight then can be used in several ways to tailor the service Adam receives once he connects with Apple. For example, as will be discussed more below, this prediction may be used to select an agent that is more adept at handling interactions with frustrated or angry customers.

Related to the above example, systems and methods of the present invention can also be used to facilitate a proactive engagement by a customer service provider or contact center. That is, given the above-described pattern of recent interactions logged within Adam's customer profile, the personal bot 405 of the present invention can predict not only that Adam is angry or frustrated, but also that the issue remains unresolved and that Adam will soon be contacting Apple again as he tries to find a resolution. With these types of predictions, the personal bot 405 can also include functionality whereby a particular enterprise (Apple in this case) is notified that Adam's issue remains unresolved and Adam will likely be trying to contact Apple again. This type of information could then prompt Apple to proactively initiate the next interaction before Adam does. As will be appreciated, this type of proactive step by an enterprise would go long way toward repairing a customer's negative feelings, while also facilitating a resolution to an ongoing issue. Which is to say, if it can be predicted that a customer's issue remains unresolved and the customer is likely to instigate another interaction soon, it may be very favorable from a customer relationship perspective for the enterprise to be the party that instigates that next interaction. With personal bot's extensive customer data covering multiple enterprises and multiple intents, these predictions on upcoming interactions can be made and the given enterprises conveniently notified.

Taking further advantage of the systems and methods disclosed herein, the personal bot 405 may be able to compute a severity rating for an incoming interaction. As used herein, a severity rating for an interaction is a prediction as to how serious or important an interaction is to a customer. Conventional contact centers typically predict a severity or importance for an incoming interaction based upon the intent of the interaction. For example, for any incoming interaction with an intent determined to be "stolen credit card", a severity rating of "high severity" (i.e., high level of importance) is allocated. As another example, for an incoming interaction with an intent determined to be "forgotten password", a severity rating of "moderate severity" (i.e., moderate level of importance) is allocated.

Similar to the process described above in relation to predicting emotional state, present systems and methods may learn to personalize severity ratings for particular customers based on the pattern of interactions stored in the customer profile 330 and interaction data for similar customers. As before, learned interaction predictors may apply specifically to a particular customer, such as Adam. Along with intent, such interaction predictors may take into account other factors, such as, for example, time of the day, type of enterprise, recent interactions, and the emotional state of the customer. With this information, the personal bot 405 can tailor severity ratings for incoming interactions for particular customers. As will be appreciated, different customers may view the same type of interaction with varying levels of importance. With the present invention, these varying levels may be determined, and service levels varied accordingly.

The systems and methods of the present invention also may be used in similar ways to make other useful predictions related to incoming interactions, which then may enable improved customer service. As discussed more below, a first of these include using the customer profile 330 of the present invention to personalize routing decisions for customers.

As another example, based on the customer profile 330 (and interaction predictors stored therewithin) as well as the intent and other contextual factors related to the incoming interaction, the personal bot 405 can make predictions regarding the likelihood of success of upselling and/or cross-selling opportunities available to the given enterprise or contact center. As an example, certain customers may be determined to be more approachable than others with upselling or cross-selling offers. As another example, a customer's emotional state could be a factor that is found to correlate with the success of upselling or cross-selling opportunities. Specifically, an angry or frustrated state may negatively impact the likely success of attempts to upsell or cross-sell a customer. Indeed, it may be found that, in certain situations, the attempt to upsell or cross-sell such customer only serves to make the customer angrier or more frustrated. It will be appreciated that contact centers could apply such insights toward making more productive routing decisions. For example, those incoming interactions that rate well in regard to upselling or cross-selling opportunities could be steered to agents that perform better in this area.

As another example, the present systems and methods may be used to predict a preferred communication channel for an incoming interaction, with the preferred communication channel being the channel offering the best chance for successful resolution given the customer. As before, based on the customer profile 330 (and interaction predictors stored therewithin) as well as the intent and other contextual factors related to the incoming interaction, the personal bot 405 can predict a preferred communication channel for initiating an interaction with the contact center. As another example, if a customer has reached out to his bank about a forgotten password, the personal bot 405 could redirect the interaction to a self-service portal which is configured to instantly resolve this kind of interaction. In this way, the customer can avoid the wait to be connected with agent that is unnecessary.

Figure 9:
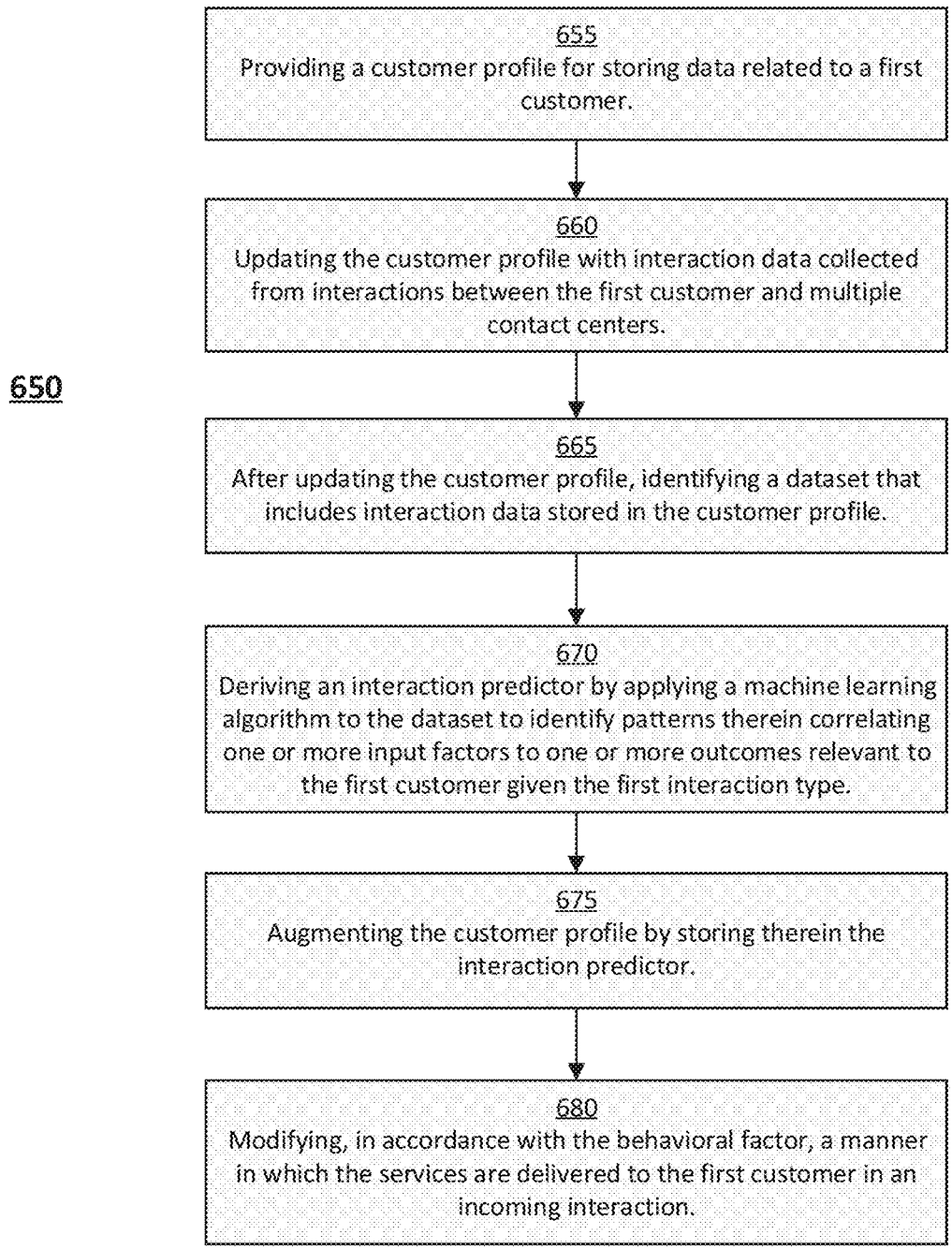
FIG. 9 is a method for creating a personalized customer profile in accordance with the present invention.

With reference now to FIG. 9, a method 650 is shown for personalizing a delivery of services to a customer (which, for clarity, will be referred to as a "first customer") via a personalized customer profile. The first customer may have a communication device, such as a smart phone, through which interactions with several contact centers are conducted.

As an initial step 655, the method 650 includes the step of providing a customer profile for storing data related to the first customer.

At a next step 660, the method 650 includes the step of updating the customer profile via performing a data collection process to collect interaction data related to the interactions between the first customer and contact centers. The data collection process may be performed repetitively so to update the customer profile after each successive one of the interactions. Described in relation to an exemplary first interaction between the first customer and a first contact centers, the data collection process may include the steps of: monitoring activity on a communication device of the first customer and, therefrom, detecting the first interaction with the first contact center; identifying data relating to the first interaction for collecting as the interaction data; and updating the customer profile to include the interaction data identified from the first interaction. The contact centers involved in the interactions from which the interaction data is collected may include multiple different contact centers.

At a next step 665, the method 650 includes the step of identifying a dataset for deriving an interaction predictor. The dataset may be based, at least in part, from the data stored within the customer profile. More specifically, the dataset may include the interaction data stored in the customer profile.

At a next step 670, the method 650 includes the step of deriving an interaction predictor by applying a machine learning algorithm to the dataset to identify patterns therein correlating one or more input factors to one or more outcomes relevant to the first customer given a particular type of interaction, which, for the sake of clarity, will be referenced as a "first interaction type". As explained more above, the interaction predictor may be based on knowledge acquired by using a machine learning algorithm to "learn" a set of data or dataset. The knowledge may relate to a behavioral factor attributable to the first customer when encountering the first interaction type. According to exemplary embodiments, the behavioral factor of the interaction predictor is defined as an emotional state, behavioral tendency, or preference. Though other types of machine learning algorithms may also be used, exemplary embodiment include a neural network.

At a next step 675, the method 650 includes the step of augmenting the customer profile of the first customer by storing therein the interaction predictor. The storage of the interaction predictor may include linking the behavioral factor to the first interaction type to facilitate real time retrieval, for example, when for use in relation to a subsequent or incoming interaction that is the same as the first interaction type.

At a next step 680, the method 650 includes the step of modifying, in accordance with the behavioral factor, a manner in which services are delivered to the customer in an incoming interaction. For example, an incoming interaction instigated by the first customer may be detected as being the same as the first interaction type. In response this detection, the derived interaction predictor may be retrieved from the customer profile of the first customer, and, upon being retrieved, the relevant behavioral factor can be identified. The manner in which services are delivered to the first customer in the incoming interaction may be modified pursuant to the behavior factor. More specifically, once identified, the behavior factor may be transmitted to the contact center involved in the incoming interaction. The contact center may then use the insight provided by the behavior factor to modify the way it delivers services to the first customer in the incoming interaction.

The method 650 may be performed in accordance with several additional or alternative steps, which provide a range of functionality. Further, significant terminology of the process may be defined so to the basic methodology yields interaction predictors covering a range of applications. Examples of these alternatives will now be discussed.

In accordance with exemplary embodiments, the steps of the data collection process may be performed by an automated assistant software program or application, which will be referred simply as "automated assistant". The automated assistant may operate on the communication device of the first customer. In example embodiments, the automated assistant is the personal bot described above. Further, the customer profile may be stored in cloud-hosted databases, which are updated by the automated assistant in accordance with the data collection process. As an example, the automated assistant may transmit the collected interaction data over a network to the cloud-hosted databases.

In exemplary embodiments, the behavioral factor of the interaction predictor is an emotional state attributable to the first customer given the first interaction type. The emotional state may be represented by at least one descriptor representative of either a negative emotional state or a positive emotional state. For example, the emotional state may be simple indicate a satisfied emotional state or an unsatisfied one. Other examples include positive emotional states, such as happy, calm, or thankful, and negative emotional states, such as angry, frustrated, confused, sad, or impatient. The interaction data included in the dataset may include data from the interactions evidencing the negative and positive emotional states. For example, the interaction data may include feedback data related to an evaluation, survey, or satisfaction score provided by the first customer after a termination of the interaction. The interaction data may include conclusory statement data related to statements made by the first customer as the interaction is concluding. As described earlier, this type of data may constitute an inferred type of feedback data. The meaning of such statements may be extracted by natural language processing.

When deriving the interaction predictors, the way in which the behavioral factor and first interaction type are defined may be varied in accordance with a desired functionality. For example, continuing with the behavioral factor being defined as an emotional state, the first interaction type may be defined as interactions having a particular intent. In such an embodiment, the resulting interaction predictor becomes a customer-specific prediction relating to an emotional state of the first customer for an incoming interaction having the particular intent. As another example, the first interaction type may be defined as interactions involving a particular contact center. In this type of embodiment, the resulting interaction predictor becomes a customer-specific prediction relating to an emotional state of the first customer for an incoming interaction involving the particular contact center. Related to this embodiment, the process for generating the interaction predictors may be repeated after successive iterations of the data collection process. This repetition may be done until the customer profile includes the interaction predictors predicting the emotional state of the first customer for interactions involving each of the contact centers that the first customer regular interacts with.

In accordance with exemplary embodiments, the characteristics attributed to the first customer via the interaction predictors may be accessed and modified by the first customer. For example, the automated assistant may generate user interfaces on a display of the communication device of the first customer that shows the emotional state data for one or more of the contact centers. The display may further prompt the first customer for input modifying the emotional state in any of the interaction predictors stored within the customer profile. To continue the example, the automated assistant may receive input from the first customer modifying the emotional state of one of the interaction predictors. The automated assistant may then update the emotional state of the interaction predictor in accordance with the input received from the first customer.

In another example, the emotional state of the interaction predictor may comprise a severity rating, which as explained above, rates a level of importance the first customer places on the first interaction type. With such embodiments, the interaction data included in the dataset may include data from each interaction evidencing the level of importance the first customer placed on it. The level of importance, for example, may be based, at least in part, on an analysis of an interaction transcript in which usage of words indicative of a high level of emotionality and/or a low level of emotionality is evaluated. In this case, if the first interaction type is defined by a particular intent, the resulting interaction predictor becomes a customer-specific prediction relating to a severity rating the first customer places on an incoming interaction having the particular intent.

Alternatively, the behavioral factor of the interaction predictor may be defined as a behavioral tendency attributable to the first customer given the first interaction type. For example, the behavioral tendency may include an upselling/cross-selling opportunity rating, which rates a willingness of the first customer to consider an upselling or cross-selling offer given the first interaction type. In this embodiment, the interaction data included in the dataset may include data from interactions describing unsuccessful upselling or cross-selling offers, successful upsell or cross-selling offers, and/or service or products purchased by the first customer in relation to upselling or cross-selling offers. As will be appreciated, in this case, if the first interaction type is defined by a particular intent, the resulting interaction predictor becomes a customer-specific prediction relating to an upselling/cross-selling opportunity rating for the first customer in an incoming interaction having the particular intent.

As another example, the behavioral factor of the interaction predictor may be defined as a preference, e.g., an agent preference, attributable to the first customer given the first interaction type. As described more below, the agent preference may include a preferred agent characteristic for the first customer given the first interaction type. With such embodiments, the interaction data included in the dataset may include choice data, the choice data including preferred agent characteristics derived from selections the first customer makes in the interactions when allowed to select an agent from among a plurality of offered agents. As will be appreciated, in this case, if the first interaction type is defined by a particular intent, the resulting interaction predictor becomes a customer-specific prediction relating to a preferred agent characteristic for the first customer in an incoming interaction having the particular intent.

In alternative embodiments, the method may include providing one or more customer databases storing data relating to other customers, such as interaction data relating to interactions occurring between such other customers and contact centers. In such embodiments, the derivation of the interaction predictor applicable to the first customer may be completed in accordance with a different process. For example, the interaction predictors may be generated by a process that includes the steps of: identifying a dataset that includes the interaction data stored within the one or more customer databases; deriving the knowledge of the interaction predictor by applying a machine learning algorithm to the dataset to identify patterns therein correlating one or more input factors to one or more outcomes relevant to a type of customer given the first interaction type; and attributing the interaction predictor to the first customer based shared similarities between the first customer and the type of customer. As explained in more detail above, the "type of customer" is representative of a subgroup of the other customers, with the members of the subgroup having one or more common characteristics found to be predictively relevant by the machine learning algorithm in regard to the generated interaction predictor. Further, the step of attributing the interaction predictor to the first customer may include the steps of: after the customer profile is updated by a completed iteration of the data collection process, identifying data within the customer profile relevant to the one or more common characteristics; and confirming that the one or more common characteristics are possessed by the customer. For example, the one or more common characteristics may relate to one or more respective characteristics stored within the biographical personal data of the customer profile. Further, in the same way as described above, the manner in which the behavioral factor and first interaction type are defined may be varied to produce similar alternative embodiments.

As stated, aspects of the present invention may be aimed at improving automated systems for routing incoming interactions at a customer service provider, such as the contact center 200. Specifically, systems will be presented that further personalize routing decisions by leveraging aspects of the customer profile 330 disclosed above. In this way, customer preferences can be better understood and then used to facilitate agent routing selections. A routing engine 635 may be provided in the contact center 200. The routing engine 635 may be a logic engine that makes routing decisions based on stored algorithms, models, rules, equations or other logic. The routing engine 635 may be a hub that receives data that relates to the incoming interaction, receives data from the contact center system 200 that relates to the incoming interaction, applies logic to the received data to calculate a routing recommendation. Data received from the contact center 200 may include data regarding the skills, experience, availability, and other characteristics about the agents of the contact center, which may be stored within an agent database 640. Once the routing recommendation is calculated, the routing engine 635 may then route an incoming interaction to a selected one of the agents by connecting the interaction to a corresponding one of the agent devices 230.

Asynchronous Resolution of Customer Requests

By way of background, there is a revolution in customer care dictated largely by the technologies related to artificial intelligence ("AI"), including machine learning and deep learning using neural networks. The paradigm of using those technologies for contact centers is to serve human interactions with self-service AI applications, such as chat bots, voice bots, etc.), that are able to understand the conversational topics or requests brought up by customers seeking services delivered by contact centers. However, when the tasks requested are not understood by AI technologies (or when the tasks are too complex to be handled by synthetic agents), a human agent may then be involved to assist in handling the request.

These activities are generally handled synchronously by the contact center according to the following models. In a traditional approach, the customer initiates a request in real time to an agent, such as during an ongoing conversation or chat, and the agent provides a response to the customer within that ongoing conversation or chat. With the advent of AI applications, customer requests are often first steered to an AI powered chatbot or voice bot. If it is determined that the automated process is unable to assist the customer, the interaction is escalated to a human agent. In either case, the customer's request is handled in real time or synchronously, as it is assumed that the customer has an immediate need that has to be fulfilled or handled immediately or, at least, resolved within the ongoing interaction or shortly thereafter.

Modern contact centers generally approach either scenario with the following assumptions and schema. First, the customer has time available at that moment to resolve the issue that prompted the interaction. Otherwise, so the reasoning goes, the customer would have used email or some other asynchronous communication channels. Second, the contact center must provide that service to the customer immediately or within a very short time frame. Third, a first attempt at servicing the customer may include an automated process or bot. As discussed, these may include an IVR, which may be a bot having a relatively low IQ, or a Voice bot or Chatbot, which may be a bot having a relatively high IQ. Fourth, if the automated process is unable to provide the customer with the necessary service, the interaction should be passed to a human agent. Of course, automated processes or chatbots, even those including advanced AI technologies, often fail to solve the customer's request and, thus, call centers must anticipate that many customer interactions will reach a human agent before resolution is reached. In certain aspects, this approach of using both automated processes and human agents can produce desirable results, as often the blending of the human touch with bot efficiencies yields effective results.

When human agents receive an interaction from an automated process, the human agent is generally context of what transpired between the automated resource and the customer. So, for example, the human agent would receive an interaction with a customer from an automated process along with certain information that provides a context about the nature of the customer's inquiry and other relevant information, which may be generally referred to herein as "context information". As an example, context information may include information identifying the customer, customer contact information (email, phone, address, social, etc.), the business application (quite often the tool required to do something with the customer), business information (marketing automation tools information, customer journey), as well as information pulled from a customer profile (past interactions, preferences, etc.).

A problem with this overall approach is the pressure placed on human agents when the interaction is transferred to them in this way. In short, the human agent is required to absorb a significant amount of contextual information while also smoothly continuing the ongoing interacting with the customer in a manner that is both pleasant and effective. For example, the human agent may have to scan the numerous data fields being shown on their monitor for particular information needed to solve a complex problem while also soothing an already frustrated customer. And this represents just one customer interaction. Agents, of course, are asked to repeat such performances continuously over the course of a long shift. Such expectations are unrealistic and, further, a chief cause of the high agent turnover rate that is usual in contact centers.

Systems and methods will now be presented that offer improvements over the above-described conventional approach. Such improvements begin with the understanding that, in many instances, customers initiate a communication with a contact center at a particular time not based on anticipating they will receive an answer or resolution immediately. Instead, a customer often initiates the communication at a particular time because the customer has availability at that time to dedicate to the activity. At such times, the customer could choose to contact the contact center using an asynchronous communication channel, such as email. However, emails generally take significant time and effort to prepare so that the customer's issue is presented with enough detail so that the issue can be fully understood by the contact center and then acted upon so that a resolution is achieved. Further, in conventional systems, even when the time is taken to properly prepare the email, there is no guarantee that the contact center will respond to a customer's email or a way for the contact center to quickly follow-up with the customer to gather information needed to resolve the issue.

The present application, thus, proposes an asynchronous resolution engine that more efficiently leverages aspects of asynchronous communications to effectively resolve customer requests. Toward this end, a system is provided that may include a personal bot assistant (or "personal bot") and an asynchronous resolution facilitator. As will be seen, the invention of the present application can enable benefits in efficiency for both contact centers and customers.

In an exemplary embodiment, the automated personal bot assistant may be similar to the personal bot already described. The personal bot assistant may include functionality dedicated toward facilitating the resolution of customer requests. Functionality of the personal bot assistant may include performing initial communications with the customer to determine the nature of the request (i.e., the intent) and collecting data from the customer that is needed to reach a resolution. As an example, the personal bot assistant may be configured as a high IQ automated process or bot that is able to communicate with the customer via voice, text, or a combination thereof. The personal bot assistant may be a fully automated process, for example, implemented as an application, widget on a webpage, or in any of the other ways described herein. The personal bot assistant may include speech recognition, natural language processing, and intent recognition abilities. Thus, as part of the intake process, the consumer may conversationally interact with personal bot assistant, with the personal bot assistant providing prompts to determine the nature of the customer's request and/or collect information from the customer related to the request. The personal bot assistant also may be used to communicate with customer when the request is fulfilled or resolved. That is, the personal bot assistant may communicate to the customer the resolution or proposed resolution, i.e., how an agent associated with a contact center proposes to resolve the customer request. The communication of the resolution further may include actions that the customer may take to resolve the request. That is, such communication may include any follow-up actions that the customer may need to complete to make that happen. When necessary, the personal bot assistant also may follow-up with the customer during the process to collect any additional information that, along the way, is determined to be necessary for a resolving the customer's request.

In an exemplary embodiment, as stated, the present invention further may include an asynchronous resolution facilitator. The asynchronous resolution facilitator (or simply "resolution facilitator") may include an artificial intelligence (AI) powered analyzer and data collector. The resolution facilitator may be configured similarly and/or provide similar functionality as the above-described predictor module 625. For example, as with the predictor module 625, the resolution facilitator may interact with the personal assistant bot, collect data regarding the customer and interactions involving the customer via connections with several data repositories, and provide analytic capabilities, including AI, for determining and predicting aspects related to the customer and interactions. In this way, the resolution facilitator provides functionality by which the data deemed necessary for resolving the customer request (which may be also referred to herein as "augmenting data") is collected and presented to an agent toward achieving a resolution. In accordance with an exemplary embodiment, the resolution facilitator constructs a resolution package, which is a package of data that is used by the contact center and agent to efficiently resolve the customer request.

As part of this functionality, the resolution facilitator may receive the data that was collected by the personal bot assistant during the initial intake conversation with the customer, which is referred to as the initial set of data. This initial set of data may include, for example: customer identification and contact information; customer data (if a previous customer); a full transcription of the request; and an intent of the customer's request (as understood by the personal bot assistant and based on the text of the conversation). The asynchronous resolution facilitator then builds (or formats instructions for building) an agent interface (which may be constructed as a webpage) that is configured to visually display the data associated with the customer request. This agent interface or, more particularly, the instructions for constructing the agent interface, is part of the data that makes up the resolution package. As an example, the agent interface may be configured as an HTML webpage. The agent interface may be configured to display the following type so of data: the customer request; whether the customer is an existing customer; a link to the customer records; the customer records themselves; a summary of the customer records; if the customer is not an existing customer, a link to the creation of a service record page; a plurality of recommended business processes or tools recommended for solving the customer request (which may be based on the intent that the customer request is determined to have); and/or a link to invoke one of the recommended business processes. Other types of data provided in the resolution package and displayed on the agent interface is provided in the discussion below.

According to exemplary embodiments, the asynchronous resolution facilitator may further determine and format metadata for associated with the agent interface. In such cases, the metadata is deemed to provide insights for better servicing the customer. For example, the metadata may include customer preferences, agent skills required, business knowledge required, language required, etc. The resolution facilitator may then send the resolution package (which includes the agent interface and the associated metadata) to a capture point of the contact center where it be routed in accordance with other work items. As will be appreciated, the metadata may then be used in routing the request to an agent that is found to be most favorable in terms of skills, experience, etc. to handle the customer request.

The data collected by the resolution facilitator may be determined by the nature of or intent of the customer request. For the different types of intents, the type of information collected may be updated via mining and making connections in datasets of previous interactions, as explained in the materials above. Per methods and systems described herein, this may include a machine learning algorithm, for example, deep learning though the use of neural networks.

In an exemplary embodiment, the agent interface is provided to efficiently display the information collected by the personal assistant bot and the resolution facilitator for the benefit of a human agent who is brought in to find a resolution to the customer request. Thus, the resolution facilitator compiles a case related to the customer request with all the relevant details, including, for example, the workflow that is to follow. Once this is done, the resolution package is routed to an appropriate agent. The agent receives the resolution package and the agent interface is displayed on the screen of the agent's computing device. Working in accordance with the agent interface and the workflow described therein, the agent then efficiently resolves the request.

Figure 10:
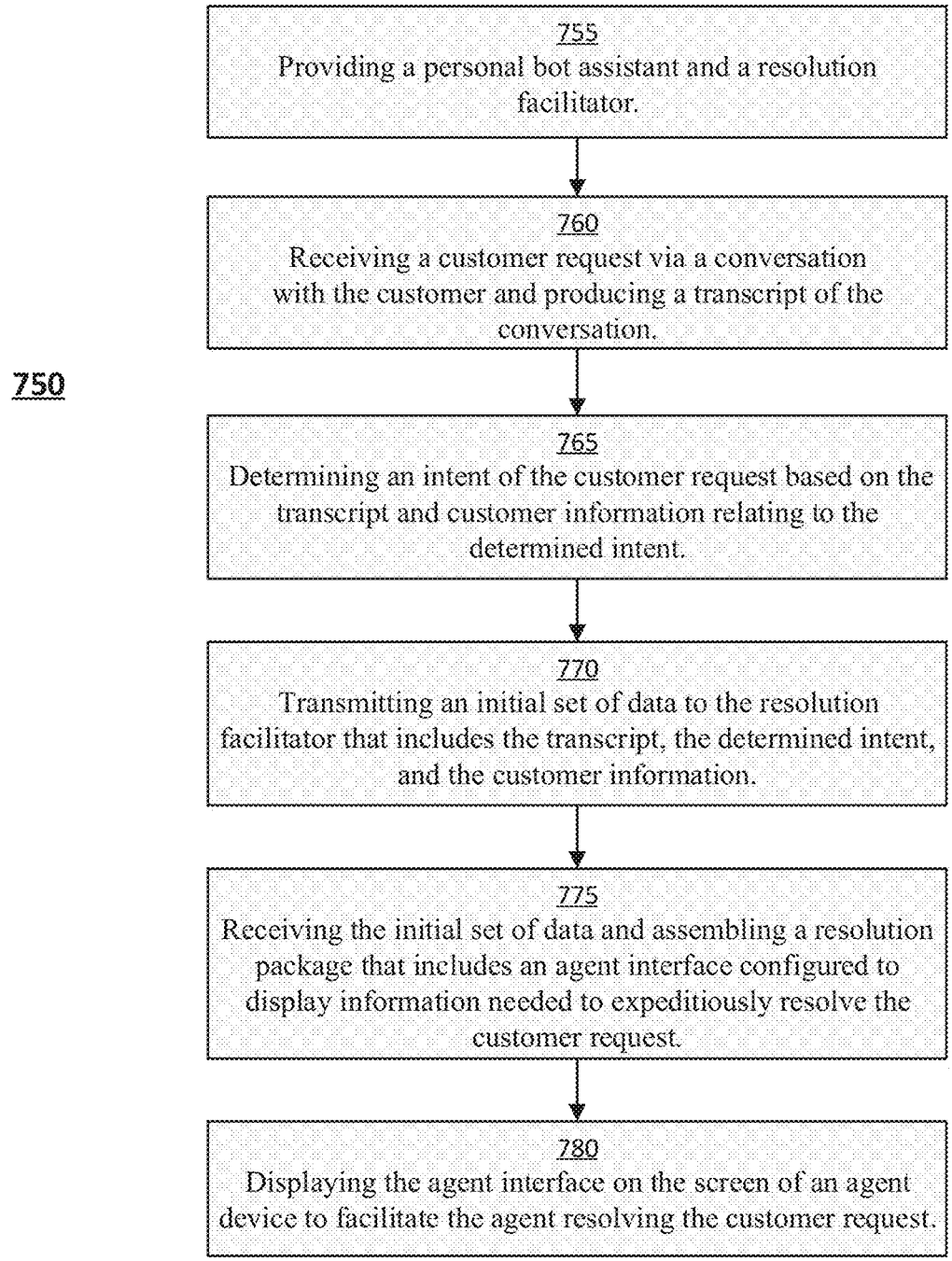
FIG. 10 is a method for asynchronously resolving customer requests in accordance with embodiments of the present invention.

Thus, with reference to FIG. 10, a computer-implemented method 750 is shown for asynchronously resolving customer requests at a contact center in accordance with the present invention. The method may include, at step 755, providing a personal bot assistant and an asynchronous resolution facilitator. At step 760, the method may include, by the personal assistant bot: receiving a customer request from a customer, the customer request being received in an initial conversation between the customer and the personal assistant bot via a personal device corresponding to the customer and producing a transcript of the initial conversation. At step 765, the method may include, by the personal assistant bot: determining an intent of the customer request based on the transcript and determining customer information relating to the customer that is judged relevant to the determined intent. At step 770, the method may include, by the personal assistant bot: transmitting an initial set of data to the asynchronous resolution facilitator, where the initial set of data may include the transcript of the initial conversation, the determined intent of the customer request, and the customer information. At step 775, the method may further include, by the asynchronous resolution facilitator: receiving the initial set of data and assembling a resolution package that may include instructions for displaying an agent interface and metadata associated with the agent interface. The assembling the resolution package may include: determining, based on the intent of the customer request, one or more recommended business processes for resolving the customer request; generating the instructions for displaying the agent interface such that the agent interface, once displayed, visually communicates at least a portion of the initial set of data and the one or more recommended business processes; determining metadata for associating with the agent interface, where the metadata is criteria for routing the customer request based on at least the determined intent; and transmitting the resolution package to a routing engine of the contact center. The method may further include using the routing engine to route the resolution package to an agent device of a particular agent (or "selected agent") of the contact center. The selected agent may be selected from among the available agents of the contact center based on criteria defined by the metadata. At step 780, the method may further include displaying the agent interface on the screen of an agent device to facilitate the agent resolving the customer request. Specifically, based on the instructions received in the resolution package, the agent interface is displaying on a screen of the agent device. Subsequent to displaying the agent interface on the agent device, the method may further include receiving input from the agent device that indicates the selected agent deems that a resolution of the customer request has been achieved. From there, the method may include providing, by the personal assistant, notification to the customer of the achieved resolution via the personal device of the customer.

In this way, the agent receives the customer request and, when initiated by the agent, the agent interface is displayed on the agent's computing device, thereby displaying all the relevant information related to the customer request and facilitates efficient resolution. Specifically, the agent may work in accordance with the agent interface and workflows described therein and thereby resolves the request. As will be appreciated, this takes place asynchronously, thereby negating the high-pressure, multi-tasking demands associated with conventional systems. Once resolved, input received form the agent may indicate that this has been achieved and inform the personal bot assistant, with the personal bot assistant then informing the customer of the resolution as well as pertinent information associated therewith.

In accordance with exemplary embodiments, the personal bot assistant may be configured as an application running on the personal device of the customer. In such cases, the personal device may be a smart phone. Further, in preferred embodiments, the asynchronous resolution facilitator may be configured as a server-hosted application that communicates with the personal device of the customer and other databases via a network, such as, the internet.

In accordance with exemplary embodiments, the personal assistant bot may include natural language processing. In such cases, the initial conversation may include an exchange of natural language voice or natural language text between the personal assistant bot and the customer. The receiving the customer request in the initial conversation may include the personal assistant bot providing prompts to determine a characteristic of the customer request.

In accordance with exemplary embodiments, the method may further include: determining, based on analysis of the initial set of data by the asynchronous resolution facilitator, augmenting data; and then collecting the augmenting data. As used herein, the augmenting data is defined as information deemed needed for resolving the customer request but found missing in the initial set of data. The agent interface may be further configured to visually communicate the augmenting data. The collecting the augmenting data may include: providing, by the personal assistant bot, a prompt to the customer via the personal device requesting the needed information; receiving, by the personal assistant bot, input from the customer via the personal device providing the augmenting information; and transmitting, by the personal assistant bot, the augmenting data to the asynchronous resolution facilitator. In accordance with other embodiments, the collecting the augmenting data may include: based on the customer information contained in the initial set of data, determining an identity of the customer; and based on the determined identity of the customer, acquiring stored data associated with past interactions between the customer and the contact center.

In accordance with exemplary embodiments, the method further includes the steps of abridging the transcript of the initial conversation. In doing this, the abridgement may include only those portions of the initial conversation deemed relevant to the determining of the intent of the customer request. In such cases, the portion of the initial set of data that is visually communicated by the agent interface may include the abridgement of the initial conversation.

In accordance with exemplary embodiments, the agent interface may include a link for invoking at least one of the one or more recommended business processes. Alternatively, the agent interface may include a visual representation of a workflow showing a plurality of ordered tasks needed for the selected agent to initiate at least one of the recommended business processes.

In accordance with exemplary embodiments, the notification provided to the customer of the achieved resolution may include a listing of one or more follow-up actions that the customer needs to complete. In accordance with other embodiments, the notification of the resolution may include a link invoking at least one of the one or more follow-up actions that the customer needs to complete.

In accordance with exemplary embodiments, the criteria of the metadata may include a plurality of agent characteristics that are judged advantageous for handling the customer request given the determined intent of the customer request.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for resolving customer requests at a contact center, wherein the contact center comprises a customer service organization having agents that interact with customers to resolve the customer requests, the method comprising:

providing a personal bot assistant, the personal bot assistant comprising an application running on the personal device of the first customer;

providing an asynchronous resolution facilitator, the asynchronous resolution facilitator comprising a server-hosted application that communicates with the personal bot via a network by the personal assistant bot,
receiving a customer request from a first customer, the first customer request being received in a first conversation between the first customer and the personal assistant bot via a personal device corresponding to the first customer;
producing a transcript of the first conversation;
determining an intent of the customer request based on the transcript;
determining customer information relating to the first customer relevant to the determined intent;
transmitting an initial set of data to the asynchronous resolution facilitator, the initial set of data including the transcript of the first conversation, the determined intent of the customer request, and the customer information;

by the asynchronous resolution facilitator,
receiving the initial set of data and assembling a resolution package that includes an agent interface and metadata associated with the agent interface, wherein the assembling the resolution package comprises:
determining, based on the intent of the customer request, one or more recommended business processes for resolving the customer request;
generating the agent interface configured to visually display at least a portion of the initial set of data and the one or more recommended business processes;
transmitting the resolution package to a routing engine of the contact center;

using the routing engine to route the resolution package to an agent device of a selected agent of the contact center, the selected agent being selected from among the agents of the contact center based on the criteria of the metadata; and based on the instructions received in the resolution package, displaying the agent interface on a screen of the agent device;

subsequent to displaying the agent interface on the agent device, receiving input from the agent device that indicates the selected agent has completed preparing a resolution for the customer request; and providing, by the personal bot assistant, notification to the first customer of the resolution via the personal device of the first customer.

2. The method according to claim 1, wherein the resolution package further includes metadata associated with the agent interface;
wherein the assembling the resolution package further comprises determining the metadata for associating with the agent interface, wherein the metadata comprises criteria for routing, the criteria for routing based on the intent of the customer request; and
wherein the selected agent is selected from among the agents of the contact center based on the criteria for routing contained in the metadata.

3. The method according to claim 1, wherein the personal assistant bot comprises natural language processing and the first conversation comprises an exchange of natural language voice or natural language text; and
wherein the personal device of the first customer comprises a smart phone.

4. The method according to claim 1, further comprising:
determining, based on analysis of the initial set of data by the asynchronous resolution facilitator, augmenting data, the augmenting data deemed needed for resolving the first customer request but found missing in the initial set of data; and
collecting the augmenting data;
wherein the agent interface is configured to also visually communicate the augmenting data.

5. The method according to claim 4, wherein the collecting the augmenting data comprises:
providing, by the personal assistant bot, a prompt to the first customer via the personal device requesting the needed information;
receiving, by the personal assistant bot, input from the first customer via the personal device providing the augmenting information; and
transmitting, by the personal assistant bot, the augmenting data to the asynchronous resolution facilitator.

6. The method according to claim 4, wherein the collecting the augmenting data comprises:
based on the customer information contained in the initial set of data, determining an identity of the first customer; and
based on the determined identity of the first customer, acquiring stored data associated with past interactions between the first customer and the contact center.

7. The method according to claim 1, further comprising the steps of abridging the transcript of the first conversation so that the abridgement includes only those portions of the first conversation deemed relevant to the determining of the intent of the customer request;
wherein the at least a portion of the initial set of data visually communicated by the agent interface comprises the abridgement of the first conversation.

8. The method according to claim 1, wherein the agent interface comprises links for invoking at least one of the one or more recommended business processes.

9. The method according to claim 1, wherein the agent interface comprises a visual representation of a workflow showing a plurality of ordered tasks needed for the selected agent to complete at least one of the one or more recommended business processes.

10. The method according to claim 1, wherein the notification of the achieved resolution comprises a listing of one or more follow-up actions that the first customer needs to complete.

11. The method according to claim 10, wherein the notification of the resolution comprises a link invoking at least one of the one or more follow-up actions that the first customer needs to complete.

12. The method according to claim 1, wherein the agent interface comprises an HTML webpage.

13. The method according to claim 1, wherein the criteria of the metadata include a plurality of agent characteristics deemed advantageous for handling the customer request given the intent of the customer request.

14. The method according to claim 1, wherein the receiving the customer request in the first conversation comprises the personal assistant bot providing prompts to determine a characteristic of the customer request.

15. A system related to customers orchestrating engagements with service providers, the system comprising:

a processor; and
a memory, wherein the memory stores instructions that, when executed by the processor, cause the processor to perform:
providing a personal bot assistant and an asynchronous resolution facilitator;
by the personal assistant bot,
receiving a customer request from a first customer, the first customer request being received in a first conversation between the first customer and the personal assistant bot via a personal device corresponding to the first customer;
producing a transcript of the first conversation;
determining an intent of the customer request based on the transcript;
determining customer information relating to the first customer relevant to the determined intent;
transmitting an initial set of data to the asynchronous resolution facilitator, the initial set of data including the transcript of the first conversation, the determined intent of the customer request, and the customer information;
by the asynchronous resolution facilitator,
receiving the initial set of data and assembling a resolution package that includes an agent interface and metadata associated with the agent interface, wherein the assembling the resolution package comprises:
determining, based on the intent of the customer request, one or more recommended business processes for resolving the customer request;
generating the agent interface such that the agent interface, when displayed, visually communicates at least a portion of the initial set of data and the one or more recommended business processes;
determining the metadata for associating with the agent interface, wherein the metadata comprises criteria for routing the customer request based on the determined intent;
transmitting the resolution package to a routing engine of the contact center;
using the routing engine to route the resolution package to an agent device of a selected agent of the contact center, the selected agent being selected from among the agents of the contact center based on the criteria of the metadata; and
based on the instructions received in the resolution package, displaying the agent interface on a screen of the agent device;
subsequent to displaying the agent interface on the agent device, receiving input from the agent device that indicates the selected agent deems a resolution of the customer request is achieved; and
providing, by the personal bot assistant, notification to the first customer of the resolution via the personal device of the first customer.

16. The system according to claim 15, wherein the personal bot assistant comprises an application running on the personal device of the first customer, and wherein the personal device comprising a smart phone; and
wherein the asynchronous resolution facilitator comprises a server-hosted application that communicates with the personal device of the first customer via a network.

17. The system according to claim 15, wherein the personal assistant bot comprises natural language processing and the first conversation comprises an exchange of natural language voice or natural language text.

18. The system according to claim 15, wherein the instructions stored by the memory, when executed by the processor, further cause the processor to perform:
   determining, based on analysis of the initial set of data by the asynchronous resolution facilitator, augmenting data, the augmenting data deemed needed for resolving the first customer request but found missing in the initial set of data; and
   collecting the augmenting data;
   wherein the agent interface is configured to visually communicate the augmenting data.

19. The system according to claim 18, wherein the collecting the augmenting data comprises:
   providing, by the personal assistant bot, a prompt to the first customer via the personal device requesting the needed information;
   receiving, by the personal assistant bot, input from the first customer via the personal device providing the augmenting information; and
   transmitting, by the personal assistant bot, the augmenting data to the asynchronous resolution facilitator.

20. The system according to claim 18, wherein the collecting the augmenting data comprises: based on the customer information contained in the initial set of data, determining an identity of the first customer; and based on the determined identity of the first customer, acquiring stored data associated with past interactions between the first customer and the contact center.

* * * * *